(12) United States Patent
Newstadt et al.

(10) Patent No.: US 8,875,284 B1
(45) Date of Patent: Oct. 28, 2014

(54) PERSONAL IDENTIFIABLE INFORMATION (PII) THEFT DETECTION AND REMEDIATION SYSTEM AND METHOD

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1594 days.

(21) Appl. No.: 12/324,174

(22) Filed: Nov. 26, 2008

(51) Int. Cl.
*G08B 21/00* (2006.01)
*H04L 29/06* (2006.01)
*G06F 21/55* (2013.01)

(52) U.S. Cl.
CPC .......... *H04L 63/1425* (2013.01); *G06F 21/552* (2013.01); *H04L 63/308* (2013.01)
USPC .......................................................... 726/22

(58) Field of Classification Search
CPC ................. G06F 21/50; G06F 21/552; H04L 63/1408–63/1425; H04L 63/30–63/308
USPC .......................................................... 726/22
See application file for complete search history.

(56) References Cited

U.S. PATENT DOCUMENTS

| | | | |
|---|---|---|---|
| 7,854,006 B1* | 12/2010 | Andruss et al. ................ | 726/24 |
| 2002/0052841 A1 | 5/2002 | Guthrie et al. | |
| 2004/0255159 A1* | 12/2004 | Williamson et al. .......... | 713/201 |
| 2006/0090073 A1 | 4/2006 | Steinberg et al. | |
| 2006/0123478 A1* | 6/2006 | Rehfuss et al. ................ | 726/22 |
| 2007/0005984 A1 | 1/2007 | Florencio et al. | |
| 2007/0006305 A1 | 1/2007 | Florencio et al. | |
| 2007/0245032 A1* | 10/2007 | KishorVarshney et al. ... | 709/229 |
| 2007/0250928 A1* | 10/2007 | Boney ............................ | 726/24 |
| 2010/0094839 A1* | 4/2010 | Brach ........................... | 707/705 |
| 2010/0175136 A1 | 7/2010 | Frumer et al. | |

OTHER PUBLICATIONS

Ford et al., "Phishing Notification Service", U.S. Appl. No. 11/849,093, filed Aug. 31, 2008.

* cited by examiner

*Primary Examiner* — Ashok Patel
*Assistant Examiner* — Kevin Bechtel
(74) *Attorney, Agent, or Firm* — Wilmer Cutler Pickering Hale and Dorr LLP

(57) ABSTRACT

Malicious code detected on a host computer system is remediated. Further, upon a determination that the user's personal identifiable information (PII) was previously exposed to the malicious code, the user is notified that the user may be a victim of theft of the user's personal identifiable information. The notification contains sufficient information for the user to take proactive steps to reduce the consequences of the personal identifiable information theft such as to contact the user's credit card company to prevent or minimize any loss associated with the personal identifiable information theft.

10 Claims, 4 Drawing Sheets

PERSONAL IDENTIFIABLE INFORMATION (PII) THEFT DETECTION AND REMEDIATION SYSTEM AND METHOD

BACKGROUND OF THE INVENTION

1. Field of the Invention

The present invention relates to the protection of computer system users. More particularly, the present invention relates to a method and apparatus for providing protection from personal identifiable information theft.

2. Description of Related Art

Malicious code on a host computer system can steal a user's personal identifiable information (PII). Examples of personal identifiable information include the user's name, account numbers, passwords, credit card numbers, social security number, bank account numbers, and/or other personal information of the user.

Often, the malicious code on the host computer system delivers the user's personal identifiable information over the Internet to a criminal. The criminal uses the personal identifiable information for the criminal's own financial gain, and at a great cost to the user and/or the institution that indemnifies the user for the loss.

To protect users from personal identifiable information theft, security applications such as anti-virus applications have been developed. These security applications typically remove the malicious code from the host computer system.

Security applications rely upon updates from security vendor update sites. These updates are an important component of the security applications. For example, as new malicious code is discovered, new virus definitions are distributed as an update to allow for the security applications to protect users from the newly discovered malicious code.

However, by the time new malicious code is discovered by security vendors and the virus definitions are distributed, a user's personal identifiable information may already have been stolen, often without the user even being aware that they were subject to a successful attack. Often, the user doesn't become aware that they were subject to a personal identifiable information theft until the user becomes a victim of identity theft.

SUMMARY OF THE INVENTION

In accordance with one embodiment, malicious code detected on a host computer system is remediated. Further, upon a determination that the user's personal identifiable information (PII) was previously exposed to the malicious code, the user is notified that the user may be a victim of theft of the user's personal identifiable information.

The notification contains sufficient information for the user to take proactive steps to reduce the consequences of the personal identifiable information theft such as to contact the user's credit card company to prevent or minimize any loss associated with the personal identifiable information theft.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 4:
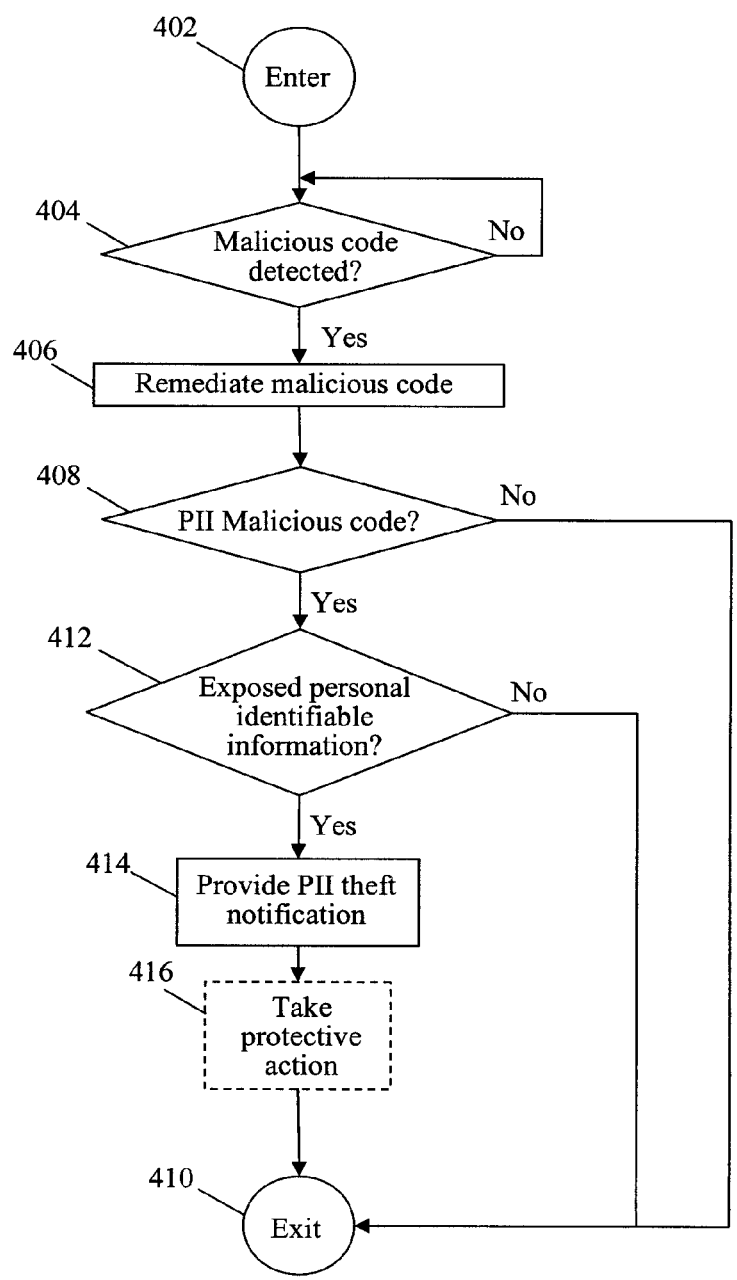
FIG. 4 is a flow diagram of a personal identifiable information (PII) theft detection and remediation process in accordance with one embodiment.

As an overview, referring to FIG. 4, malicious code detected on a host computer system is remediated in a REMEDIATE MALICIOUS CODE OPERATION 406. Further, upon a determination that the user's personal identifiable information (PII) was previously exposed to the malicious code in an EXPOSED PERSONAL IDENTIFIABLE INFORMATION CHECK OPERATION 412, the user is notified that the user may be a victim of theft of the user's personal identifiable information in a PROVIDE PII THEFT NOTIFICATION OPERATION 414.

The notification contains sufficient information for the user to take proactive steps to reduce the consequences of the personal identifiable information theft such as to contact the user's credit card company to prevent or minimize any loss associated with the personal identifiable information theft.

Figure 1:
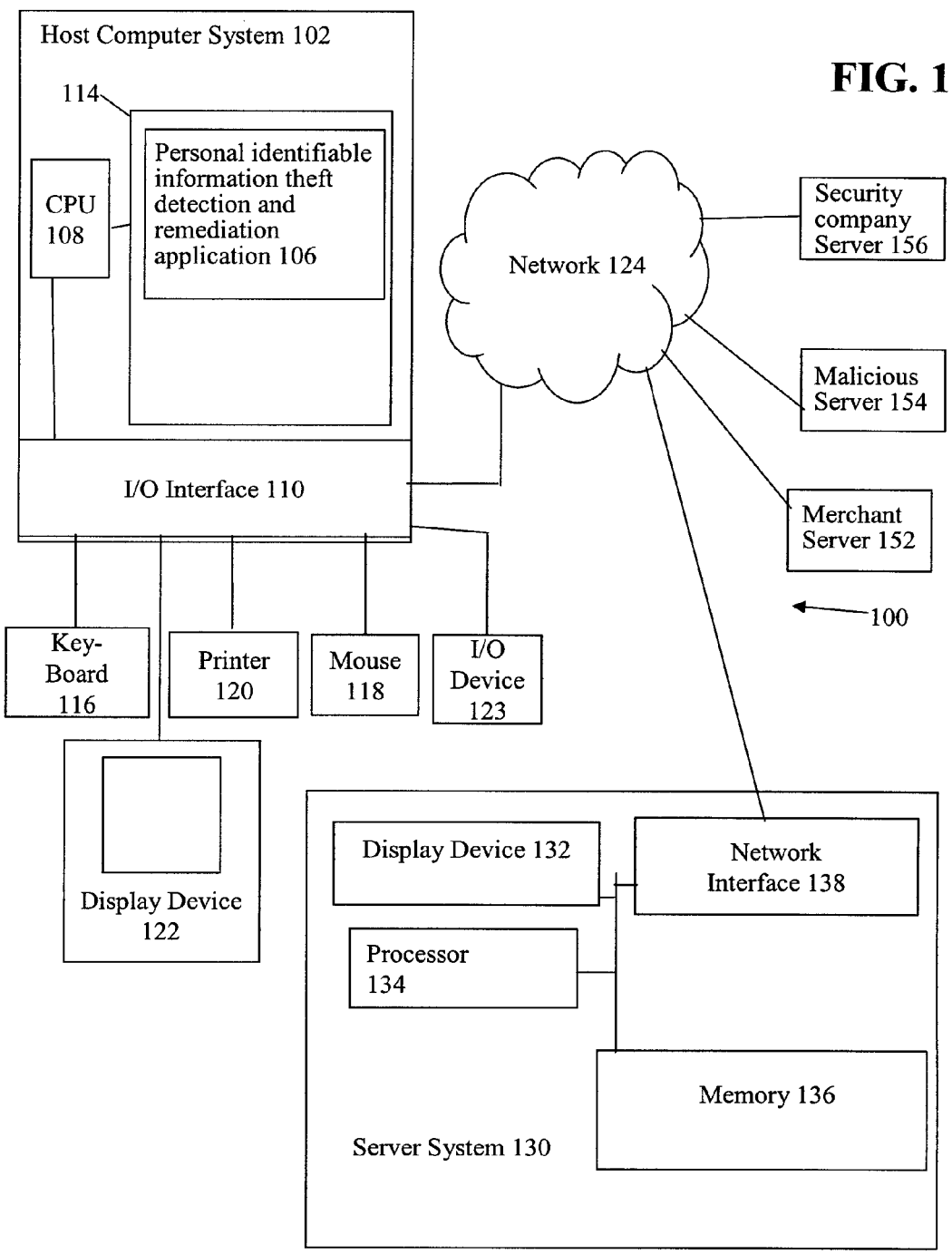
FIG. 1 is a diagram of a client-server system that includes a personal identifiable information theft detection and remediation application executing on a host computer system in accordance with one embodiment.

More particularly, FIG. 1 is a diagram of a client-server system 100 that includes a personal identifiable information theft detection and remediation application 106 executing on a host computer system 102, e.g., a first computer system, in accordance with one embodiment.

Host computer system 102, sometimes called a client or user device, typically includes a central processing unit (CPU) 108, hereinafter processor 108, an input output (I/O) interface 110, and a memory 114.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, personal identifiable information theft detection and remediation application 106 is loaded into host computer system 102 via I/O device 123, such as from a CD, DVD or floppy disk containing personal identifiable information theft detection and remediation application 106.

Host computer system 102 is coupled to a server system 130 of client-server system 100 by network 124. Server system 130 typically includes a display device 132, a processor 134, a memory 136, and a network interface 138.

Further, host computer system 102 is also coupled to a merchant server 152, a malicious server 154, and a security company server 156 by network 124. In one embodiment, merchant server 152, malicious server 154, and security company server 156 are similar to host computer system 102 and/or server system 130, for example, include a central processing unit, an input output (I/O) interface, and a memory.

Merchant server 152, malicious server 154, and security company server 156 may further include standard devices like a keyboard, a mouse, a printer, a display device and an I/O device(s). The various hardware components of merchant server 152, malicious server 154, and security company server 156 are not illustrated to avoid detracting from the principles of this embodiment.

Network 124 can be any network or network system that is of interest to a user. In various embodiments, network interface 138 and I/O interface 110 include analog modems, digital modems, or a network interface card.

Personal identifiable information theft detection and remediation application 106 is stored in memory 114 of host computer system 102 and executed on host computer system 102. The particular type of and configuration of host computer system 102, merchant server 152, malicious server 154, security company server 156, and server system 130 are not essential to this embodiment.

Figure 2:
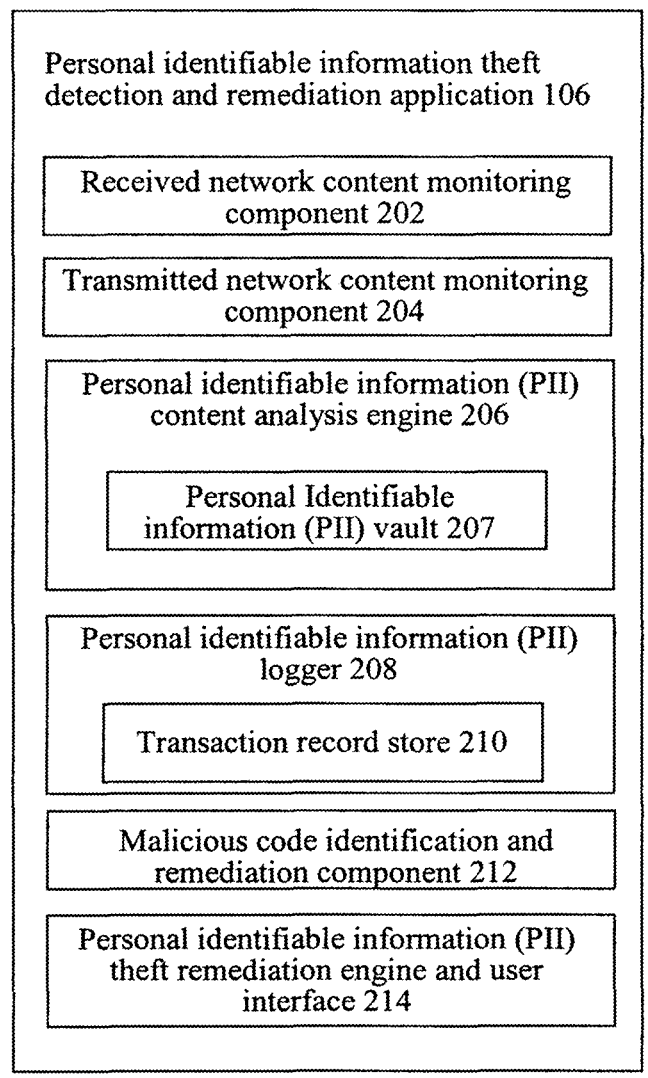
FIG. 2 is a block diagram of the personal identifiable information theft detection and remediation application of FIG. 1 in accordance with one embodiment.

FIG. 2 is a block diagram of personal identifiable information theft detection and remediation application 106 of FIG. 1 in accordance with one embodiment. Referring now to FIGS. 1 and 2 together, personal identifiable information theft detection and remediation application 106 includes a received network content monitoring component 202, a transmitted network content monitoring component 204, a personal identifiable information (PII) content analysis engine 206, a personal identifiable information (PII) logger 208, a malicious code identification and remediation component 212, and a personal identifiable information (PII) theft remediation engine and user interface 214.

Received network content monitoring component 202 monitors received network content to host computer system 102 from network 124, e.g., Web activity, of host computer system 102. Received network content monitoring component 202 is implemented as a Web browser plug-in (BHO), local proxy, or network based proxy. Received network content monitoring component 202 monitors network content from either the document object model (DOM) level or the network traffic level in one embodiment.

Illustratively, received network content includes HTML (HyperText Markup Language), script, flash, or other content received by host computer system 102 from network 124.

In one specific embodiment, received network content monitoring component 202 is a HyperText Transfer Protocol (HTTP) proxy. In accordance with this embodiment, received network content monitoring component 202 sits between user applications of host computer system 102, e.g., a Web browser of host computer system 102, and network 124. HTTP traffic for user applications of host computer system 102, i.e., received network content, passes through received network content monitoring component 202, which monitors the HTTP traffic.

Received network content monitoring component 202 passes the received network content to PII content analysis engine 206, which analyzes the received network content for personal identifiable information requests. In one embodiment, a personal identifiable information request is a request for personal identifiable information of the user.

To illustrate, in accordance with one embodiment, received network content monitoring component 202 monitors Web content, i.e., one example of received network content, downloaded to (received by) host computer system 102. The Web content is passed from received network content monitoring component 202 to PII content analysis engine 206.

PII content analysis engine 206 analyzes the received network content to determine whether the user has been requested to provide personal identifiable information of the user. The user's personal identifiable information is private information of the user that is exploitable by a criminal. Typically, the private information is exploited by a criminal for unlawful pecuniary gain. Examples of personal identifiable information include the user's name, account numbers, passwords, credit card numbers, social security number, bank account numbers, and/or other personal information of the user.

For example, the downloaded Web content is a merchant's web page that includes a personal identifiable information request. One example of a personal identifiable information request includes a request for the user's login name and password, e.g., to access the merchant server. Another example of a personal identifiable information request is a request for the user's credit card information, e.g., to conduct a purchase with the merchant server.

Although examples of personal identifiable information requests are set forth above, in light of this disclosure, those of skill in the art will understand that PII content analysis engine 206 analyzes received network content for any number of types of requests for personal identifiable information. In one embodiment, an administrator and/or user of host computer system 102 configures PII content analysis engine 206 to analyze received network content for specific personal identifiable information requests.

Transmitted network content monitoring component 204 monitors transmitted network content from host computer system 102 to network 124, e.g., Web activity, of host computer system 102. Transmitted network content monitoring component 204 is similar to received network content monitoring component 202 and can be implemented as a Web browser plug-in (BHO), local proxy, or network based proxy. Transmitted network content monitoring component 204 monitors network content from either the document object model (DOM) level or the network traffic level in one embodiment.

In one embodiment, transmitted network content includes HTML, script, flash, or other content transmitted by host computer system 102 to network 124. Illustratively, applications of host computer system 102, e.g., a web browser or other application, generate the transmitted network content.

In one specific embodiment, transmitted network content monitoring component 204 is a HyperText Transfer Protocol (HTTP) proxy. In accordance with this embodiment, transmitted network content monitoring component 204 sits between user applications of host computer system 102, e.g., a Web browser of host computer system 102, and network 124. HTTP traffic from user applications of host computer system 102, i.e., transmitted network content, passes through transmitted network content monitoring component 204, which monitors the HTTP traffic.

Transmitted network content monitoring component 204 passes the transmitted network content to PII content analysis engine 206, which analyzes the transmitted network content for personal identifiable information. Optionally, transmitted network content monitoring component 204 also identifies the application that is responsible for transmitting the transmitted network content.

To illustrate, in accordance with one embodiment, transmitted network content monitoring component 204 monitors Web form submissions, i.e., one example of transmitted network content, uploaded (transmitted) from host computer system 102. The Web form submission is passed from transmitted network content monitoring component 204 to PII content analysis engine 206.

PII content analysis engine 206 analyzes the transmitted network content to determine whether personal identifiable information of the user has been provided. Recall that the user's personal identifiable information includes the user's name, account numbers, passwords, credit card numbers, social security number, bank account numbers, and/or other personal information of the user.

For example, the web form submission includes the user's login name and password, e.g., to access the merchant server. In another example, the web form submission includes the user's credit card information, e.g., to conduct a purchase with the merchant server.

Although examples of personal identifiable information are set forth above, in light of this disclosure, those of skill in the art will understand that PII content analysis engine 206 analyzes transmitted network content for any number of personal identifiable information. In one embodiment, an administrator and/or user of host computer system 102 configures PII content analysis engine 206 to analyze transmitted network content for specific personal identifiable information.

Although received network content monitoring component 202 and transmitted network content monitoring component 204 are set forth above as separate components, in one embodiment, a single component, e.g., called a network content monitoring component, performs the combined functionality of received network content monitoring component 202 and transmitted network content monitoring component 204.

As set forth above, PII content analysis engine 206 receives the received network content from received network content monitoring component 202 and/or transmitted network content from transmitted network content monitoring component 204. Received network content and transmitted network content are generally referred to as network content. PII content analysis engine 206 inspects the network content to determine if the network content includes personal identifiable information.

In one embodiment, PII content analysis engine 206 inspects received network content to determine whether a personal identifiable information request has been received. Upon determining that a personal identifiable information request has been received, PII content analysis engine 206 determines that the transmitted network content transmitted in response to the personal identifiable information request includes personal identifiable information.

To illustrate, the received network content includes a request for the user's login name and password, e.g., one example of a personal identifiable information request. The transmitted network content transmitted in response to the request for the user's login name and password is assumed to be the user's login name and password. Accordingly, PII content analysis engine 206 determines that the user's personal identifiable information has been provided, i.e., the user's login name and password.

In another example, the received network content is a password and/or credentials input page, another example of a personal identifiable information request. The transmitted network content transmitted in response to the password and/or credentials input page is assumed to be the user's password and/or credentials. Accordingly, PII content analysis engine 206 determines that the user's personal identifiable information has been provided, i.e., the user's password and/or credentials.

In another embodiment, PII content analysis engine 206 analyzes the format of transmitted network content to determine whether the user's personal identifiable information has been provided. To illustrate, the format of the social security number is typically xxx-xx-xxxx. Accordingly, upon determining that the transmitted network content includes a number having the format of a social security number, PII content analysis engine 206 determines that the user's personal identifiable information has been provided, i.e., the user's social security number. Generally, PII content analysis engine 206 determines whether the format of transmitted network content matches the format of the user's personal identifiable information.

In another embodiment, the user's personal identifiable information is contained within a personal identifiable information (PII) vault 207, e.g., a data structure, contained within or accessible by PII content analysis engine 206. For example, during installation of personal identifiable information theft detection and remediation application 106, the user inputs personal identifiable information of the user. This personal identifiable information is then stored, e.g., in encrypted or otherwise secure form, in PII vault 207.

Transmitted network content is then analyzed by PII content analysis engine 206 to determine whether the transmitted network content matches the personal identifiable information stored in PII vault 207. Upon a match, PII content analysis engine 206 determines that the user's personal identifiable information is being provided.

Although particular analysis techniques to determine that the user's personal identifiable information is being provided are set forth above, in light of this disclosure, those of skill in the art will understand that other techniques are used in other embodiments.

Upon determining that the user's personal identifiable information is being provided, PII content analysis engine 206 logs the transmitted network content to PII logger 208. In addition, PII content analysis engine 206 logs the timestamp, i.e., the time and date, that the user's personal identifiable information was provided. In one embodiment, the PII transmitting application of host computer system 102 that is responsible for the transmission of the personal identifiable information is also logged.

PII logger 208 receives the user's personal identifiable information, the associated time stamp and optionally the PII transmitting application from PII content analysis engine 206. In one embodiment, the user's personal identifiable information that was provided, the associated timestamp and optionally the PII transmitting application are referred to as a transaction. Generally, the act of providing personal identifiable information is referred to as a transaction. A transaction is not limited to a financial transaction, e.g., transferring of money or purchasing a product, but includes any transmission of personal identifiable information.

PII logger 208 stores, sometimes called logs, the personal identifiable information that was provided, the associated timestamp, i.e., the transaction, and optionally the PII transmitting application to a transaction record store 210 of or accessible to PII logger 208. Transaction record store 210 is a security encrypted data store in one embodiment.

PII logger 208 stores the minimum amount of information that is necessary to identify the personal identifiable information provided for later remediation as discussed further below. The stored portion of the personal identifiable information is sometimes called the critical portion of the personal identifiable information. Generally, the critical portion allows later identification of the personal identifiable information provided. By storing only the critical portion of the personal identifiable information, the amount of personal identifiable information stored is minimized thus minimizing any unlikely theft of the personal identifiable information from transaction record store 210 as well as reducing the overall amount of information stored.

For example, PII logger 208 may receive a credit card number and expiration date, e.g., one example of personal identifiable information. However, PII logger 208 only stores the credit card number, i.e., the critical portion, and not the expiration date. The critical portion, i.e., the credit card number in this example, is sufficient information to facilitate cancellation of the credit card by the credit card issuer in the event it is later discovered that the credit card number may have been stolen as discussed further below.

In another example, PII logger 208 only stores the last four digits of the credit card number, i.e., the critical portion, and not the expiration date or the full credit card number.

In another example, the personal identifiable information includes a user name and password from a login page. In accordance with this example, the critical portion is the user name, which is stored in transaction record store 210.

Malicious code identification and remediation component 212 identifies malicious code on host computer system 102. In one embodiment, malicious code is defined as any computer program, module, set of modules, or code that enters a computer system without an authorized user's knowledge and/or without an authorized user's consent.

In one embodiment, malicious code identification and remediation component 212 includes an antivirus scanner that scans for malicious code that has an associated virus definition. In another embodiment, malicious code identification and remediation component 212 includes a behavior monitoring component that identifies malicious code based upon the behavior of the malicious code. For example, malicious code identification and remediation component 212 identifies malicious code that logs keyboard activity, sometimes called keyboard logging, and/or malicious code that uploads encrypted data to a potential bot network.

In addition, upon identifying malicious code, malicious code identification and remediation component 212 determines how long the malicious code has been present on host computer system 102, i.e., how long host computer system 102 may have been infected with the threat. In one embodiment, malicious code identification and remediation component 212 uses verifiable timestamps on host computer system 102 to determine how long the malicious code has been present on host computer system 102. In another embodiment, malicious code identification and remediation component 212 determines how long the malicious code has been in the wild and determines that host computer system 102 may have been infected with the malicious code during this time. Generally, malicious code identification and remediation component 212 determines the possible infection time period of when host computer system 102 may have been infected with the malicious code.

In another embodiment, the possible infection time period is undeterminable. In accordance with this embodiment, the possible infection time period includes the entire past.

Although various malicious code and possible infection time period identification techniques are set forth above, in light of this disclosure, those of skill in the art will understand that other malicious code and possible infection time period identification techniques are used in other embodiments.

Further, once malicious code and the associated possible infection time period have been identified, malicious code identification and remediation component 212 takes remediation action to protect host computer system 102 from the malicious code. For example, the malicious code is terminated, quarantine, or otherwise removed. Although various examples of remediation action are set forth, in light of this disclosure, those of skill in the art will understand that other remediation actions are taken in other embodiments.

After taking remediation action, malicious code identification and remediation component 212 notifies PII theft remediation engine and user interface 214 that malicious code was detected on host computer system 102 and provides the possible infection time period that host computer system 102 was possibly infected with the malicious code.

Upon receiving the notification, PII theft remediation engine and user interface 214 determines whether the malicious code is the type that steals personal identifiable information. Malicious code that steals personal identifiable information is sometimes called personal identifiable information (PII) malicious code. For example, if the malicious code only delete files from host computer system 102, the malicious code is not PII malicious code. Conversely, if the malicious code delivers personal identifiable information over the Internet to a malicious site, e.g., for use by a criminal, the malicious code is PII malicious code. In one embodiment, all malicious code is considered PII malicious code.

In another embodiment, malicious code identification and remediation component 212 determines whether the malicious code is PII malicious code. Only in the event that the malicious code is PII malicious code does malicious code identification and remediation component 212 provide the malicious code detection notification to PII theft remediation engine and user interface 214.

In either embodiment, upon a determination that PII malicious code has been detected on host computer system 102, PII theft remediation engine and user interface 214 queries transaction records in transaction record store 210 to determine whether any personal identifiable information was exposed on host computer system 102 during the possible infection time period.

As discussed above, each transaction record in transaction record store 210 includes the timestamp, i.e., time and date, that the personal identifiable information identified by the transaction record was transmitted from host computer system 102. Each transaction record is queried to determine if the timestamp of the transaction record falls within the possible infection time period. If there is a match between the timestamp of the transaction record and the possible infection time period, i.e., the timestamp is within the possible infection time period, then the personal identifiable information identified by the transaction record was exposed. Recall that each transaction record includes a critical portion of the personal identifiable information that allows identification of the personal identifiable information exposed.

Generally, exposed personal identifiable information is personal identifiable information that was transmitted from host computer system 102 during the possible infection time period that the malicious code was possibly present on host computer system 102. The exposed personal identifiable information was not necessarily stolen in one embodiment, however, there is an extremely high risk that the exposed personal identifiable information was stolen.

In another embodiment, upon a determination that PII malicious code has been detected on host computer system 102, PII theft remediation engine and user interface 214 queries transaction records in transaction record store 210 to determine whether any personal identifiable information was exposed on host computer system 102 by being transmitted from the PII malicious code.

As discussed above, optionally, each transaction record in transaction record store 210 includes the PII transmitting application that was responsible for transmitting the personal identifiable information. Each transaction record is queried to determine if the PII transmitting application is the detected PII malicious code. If there is a match between the PII transmitting application and the PII malicious code, i.e., the PII malicious code was responsible for transmitting the personal identifiable information, then the personal identifiable information identified by the transaction record was exposed.

Recall that each transaction record includes a critical portion of the personal identifiable information that allows identification of the personal identifiable information exposed.

In accordance with this embodiment, exposed personal identifiable information is personal identifiable information that was transmitted from the PII malicious code.

In either embodiment, upon a determination that personal identifiable information was exposed on host computer system 102, PII theft remediation engine and user interface 214 provides a personal identifiable information (PII) theft notification to the user. The PII theft notification notifies the user that particular personal identifiable information may have been stolen. Further, in one embodiment, the PII theft notification presents the user with options on how to remediate the possible personal identifiable information theft. In other words, the PII theft notification presents the user with options on how to prevent the exposed personal identifiable information from being exploited as well as options to minimize any loss that has already occurred.

The user may be given manual or automated options for the PII theft remediation. For example of a manual PII theft remediation option, a phone number of the credit card issuer along with the exposed credit card number are presented to the user, e.g., on display device 122, with a suggestion that the user call the credit card issuer to cancel/reissue the credit card. For example of an automated PII theft remediation option, a link to the credit card issuer's server along with the exposed credit card number are presented to the user, e.g., on display device 122, with a suggestion that the user upload (transmit) the credit card cancellation/reissuance request directly to the credit card issuer's server over network 124, e.g., the Internet.

In another embodiment, PII theft remediation engine and user interface 214 helps the user change exposed passwords, for example, by providing links to the appropriate web sites. In one embodiment, PII theft remediation engine and user interface 214 stores any new passwords in a secure password vault, e.g., PII vault 207.

In another embodiment, PII theft remediation engine and user interface 214 takes protective action to remediate the possible personal identifiable information theft. For example, PII theft remediation engine and user interface 214 uploads the exposed credit card number directly to the credit card issuer for cancellation of the credit card and reissuance of a new credit card.

Figure 3:
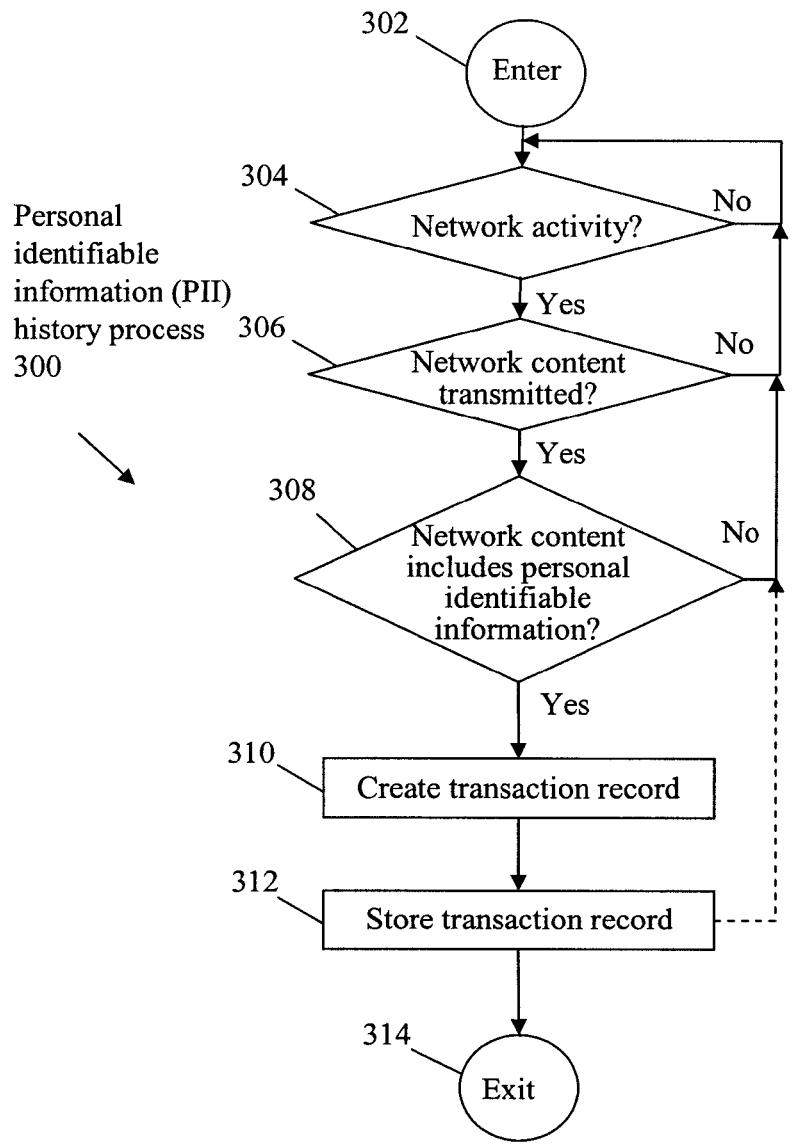
FIG. 3 is a flow diagram of a personal identifiable information (PII) history process in accordance with one embodiment.

FIG. 3 is a flow diagram of a personal identifiable information (PII) history process 300 in accordance with one embodiment. Referring now to FIGS. 1, 2 and 3 together, execution of personal identifiable information theft detection and remediation application 106 by processor 108 results in the operations of PII history process 300 as described below in one embodiment.

From an ENTER OPERATION 302, flow moves to a NETWORK ACTIVITY CHECK OPERATION 304. In NETWORK ACTIVITY CHECK OPERATION 304, a determination is made as to whether there is network activity, i.e., network content has been received and/or transmitted. As discussed above, received network content monitoring component 202 monitors for received network content and transmitted network content monitoring component 204 monitors for transmitted network content If there is no network activity, flow remains at NETWORK ACTIVITY CHECK OPERATION 304. Conversely, if there has been network activity, flow moves to a NETWORK CONTENT TRANSMITTED CHECK OPERATION 306.

In NETWORK CONTENT TRANSMITTED CHECK OPERATION 306, a determination is made as to whether network content has been transmitted. As discussed above, transmitted network content monitoring component 204 monitors for transmitted network content.

If a determination is made that there is no network content transmitted, flow returns from NETWORK CONTENT TRANSMITTED CHECK OPERATION 306 to NETWORK ACTIVITY CHECK OPERATION 304. In this event, as no network content has been transmitted, no personal identifiable information has been transmitted and thus there is no associated risk of theft of the personal identifiable information. Accordingly, no further action is taken and flow returns to NETWORK ACTIVITY CHECK OPERATION 304 for further network activity monitoring.

Conversely, if a determination is made that network content was transmitted, flow moves from NETWORK CONTENT TRANSMITTED CHECK OPERATION 306 to a NETWORK CONTENT INCLUDES PERSONAL IDENTIFIABLE INFORMATION CHECK OPERATION 308. In NETWORK CONTENT INCLUDES PERSONAL IDENTIFIABLE INFORMATION CHECK OPERATION 308, a determination is made as to whether the transmitted network content includes personal identifiable information. As discussed above, PII content analysis engine 206 determines whether transmitted network content includes personal identifiable information.

If a determination is made that the transmitted network content does not include personal identifiable information, flow returns from NETWORK CONTENT INCLUDES PERSONAL IDENTIFIABLE INFORMATION CHECK OPERATION 308 to NETWORK ACTIVITY CHECK OPERATION 304. In this event, as no personal identifiable information has been transmitted, there is no associated risk of theft of the personal identifiable information. Accordingly, no further action is taken and flow returns to NETWORK ACTIVITY CHECK OPERATION 304 for further network activity monitoring.

Conversely, if a determination is made that the network content does include personal identifiable information, flow moves from NETWORK CONTENT INCLUDES PERSONAL IDENTIFIABLE INFORMATION CHECK OPERATION 308 to a CREATE TRANSACTION RECORD OPERATION 310. In CREATE TRANSACTION RECORD OPERATION 310, a transaction record of the personal identifiable information is created. As discussed above, PII logger 208 creates the transaction record including the critical portion of the personal identifiable information included in the transmitted network content, associated time stamp and optionally the PII transmitting application.

From CREATE TRANSACTION RECORD OPERATION 310, flow moves to STORE TRANSACTION RECORD OPERATION 312. In STORE TRANSACTION RECORD OPERATION 312, the transaction record created in CREATE TRANSACTION RECORD OPERATION 310 is stored. As discussed above, PII logger 208 stores the transaction record in transaction record store 210. From STORE TRANSACTION RECORD OPERATION 312, flow moves to and exits at an EXIT OPERATION 314 or returns to NETWORK ACTIVITY CHECK OPERATION 304 for further network activity monitoring.

In the above manner, transaction records of all personal identifiable information transmitted from host computer system 102 are created and stored for later use in the event that PIT malicious code is detected on host computer system 102 as set forth below in greater detail with reference to FIG. 4.

FIG. 4 is a flow diagram of a personal identifiable information theft detection and remediation process 400 in accordance with one embodiment. Referring now to FIGS. 1, 2 and 4 together, execution of personal identifiable information theft detection and remediation application 106 by processor 108 results in the operations of personal identifiable information theft detection and remediation process 400 as described below in one embodiment.

From an ENTER OPERATION 402, flow moves to a MALICIOUS CODE DETECTED CHECK OPERATION 404. In MALICIOUS CODE DETECTED CHECK OPERATION 404, a determination is made as to whether malicious code is detected on host computer system 102. As set forth above, malicious code identification and remediation component 212 detects malicious code on host computer system 102.

If malicious code is not detected, flow remains at MALICIOUS CODE DETECTED CHECK OPERATION 404. Conversely, if malicious code is detected, flow moves from MALICIOUS CODE DETECTED CHECK OPERATION 404 to a REMEDIATE MALICIOUS CODE OPERATION 406.

In REMEDIATE MALICIOUS CODE OPERATION 406, the malicious code detected on host computer system 102 is remediated. As set forth above, malicious code identification and remediation component 212 remediate the detected malicious code.

From REMEDIATE MALICIOUS CODE OPERATION 406, flow moves to a PII MALICIOUS CODE CHECK OPERATION 408. In PII MALICIOUS CODE CHECK OPERATION 408, a determination is made as to whether the detected malicious code is PII malicious code. As set forth above, PII malicious code is malicious code that steals personal identifiable information. As further set forth above, malicious code identification and remediation component 212 and/or PII theft remediation engine and user interface 214 determine whether the malicious code is PII malicious code.

If a determination is made that the malicious code is not PII malicious code, flow moves from PII MALICIOUS CODE CHECK OPERATION 408 and exits at an EXIT OPERATION 410 or returns to MALICIOUS CODE DETECTED CHECK OPERATION 404. In this event, the malicious code does not steal personal identifiable information and so there is no associated risk of theft of the personal identifiable information. Accordingly, no further action is taken and flow moves to EXIT OPERATION 410 or returns to MALICIOUS CODE DETECTED CHECK OPERATION 404.

Conversely, if a determination is made that the malicious code is PII malicious code, flow moves from PII MALICIOUS CODE CHECK OPERATION 408 to an EXPOSED PERSONAL IDENTIFIABLE INFORMATION CHECK OPERATION 412. In EXPOSED PERSONAL IDENTIFIABLE INFORMATION CHECK OPERATION 412, a determination is made as to whether personal identifiable information was exposed to the PII malicious code. As discussed above, PII theft remediation engine and user interface 214 determines whether personal identifiable information was exposed. Illustratively, the transaction records of transaction record store 210 are queried to determine whether any of the timestamps of the transaction records fall within the possible infection time period of the PII malicious code and/or to determine whether the PII transmitting applications of the transaction records are the PII malicious code. If so, then personal identifiable information was exposed to the PII malicious code.

If personal identifiable information was not exposed, flow moves from EXPOSED PERSONAL IDENTIFIABLE INFORMATION CHECK OPERATION 412 and exits at EXIT OPERATION 410 or returns to MALICIOUS CODE DETECTED CHECK OPERATION 404. In this event, personal identifiable information was not exposed and so there is no associated risk of theft of the personal identifiable information. Accordingly, no further action is taken and flow moves to EXIT OPERATION 410 or returns to MALICIOUS CODE DETECTED CHECK OPERATION 404.

Conversely, upon a determination that personal identifiable information was exposed, flow moves from EXPOSED PERSONAL IDENTIFIABLE INFORMATION CHECK OPERATION 412 to a PROVIDE PII THEFT NOTIFICATION OPERATION 414. In PROVIDE PII THEFT NOTIFICATION OPERATION 414, a PII theft notification is provided, e.g., to the user of host computer system 102. As set forth above, the PII theft notification notifies the user that particular personal identifiable information, i.e., the exposed personal identifiable information, may have been stolen. Further, in one embodiment, the PII theft notification presents the user with options on how to prevent the exposed personal identifiable information from being exploited as well as options to minimize any loss that has already occurred. As set forth above, PII theft remediation engine and user interface 214 provides the PII theft notification.

From PROVIDE PII THEFT NOTIFICATION OPERATION 414, flow moves, optionally, to a TAKE PROTECTIVE ACTION OPERATION 416. In TAKE PROTECTIVE ACTION OPERATION 416, protective action is taken to remediate the possible personal identifiable information theft. As set forth above, PII theft remediation engine and user interface 214 takes the protective action directly and without user action.

From TAKE PROTECTIVE ACTION OPERATION 416 (or from PROVIDE PII THEFT NOTIFICATION OPERATION 414 in the event that TAKE PROTECTIVE ACTION OPERATION 416 is not performed), flow moves to and exits at EXIT OPERATION 410 or returns to MALICIOUS CODE DETECTED CHECK OPERATION 404.

To illustrate a working example, paying particular attention again to FIGS. 1 and 3 together, assume the case where host computer system 102 is infected with malicious code which has not been detected because an antivirus definition for the malicious code has not yet been created.

The user of host computer system 102 conducts a purchase with merchant server 152 in which the user's credit card number and expiration date are provided. As the user provides the credit card number and expiration date, a determination is made that there is network activity in NETWORK ACTIVITY CHECK OPERATION 304, a determination is made that network content is transmitted in NETWORK CONTENT TRANSMITTED CHECK OPERATION 306, and a determination is made that the network content does include personal identifiable information in NETWORK CONTENT INCLUDES PERSONAL IDENTIFIABLE INFORMATION CHECK OPERATION 308.

Accordingly, a transaction record is created in CREATE TRANSACTION RECORD OPERATION 310 and stored in STORE TRANSACTION RECORD OPERATION 312. This transaction record includes at least the credit card number and the time stamp of when the credit card number was provided in accordance with this example.

Unfortunately, unknown to the user, the undetected malicious code on host computer system 102 intercepts the credit card number and expiration date and transmits this personal identifiable information to malicious server 154 over network 124.

Paying particular attention now to FIGS. 1 and 4 together, assume the case where updated virus definitions from security company server 156 are received by host computer system 102. The updated virus definitions include a virus definition of the yet undetected malicious code on host computer system 102. Using this virus definition, e.g., with an antivirus scanner, the malicious code is detected on host computer system 102 and the possible infection time period during which host computer system 102 was possibly infected with the malicious code is determined.

Accordingly, a determination is made that malicious code is detected in MALICIOUS CODE DETECTED CHECK OPERATION 404. The malicious code is remediated in REMEDIATE MALICIOUS CODE OPERATION 406. As the malicious code does steal personal identifiable information, a determination is made that the malicious code is PII malicious code in PII MALICIOUS CODE CHECK OPERATION 408.

Upon a determination that the user's credit card number was provided to merchant server 152 during the possible infection time period, a determination is made that personal identifiable information was exposed in EXPOSED PERSONAL IDENTIFIABLE INFORMATION CHECK OPERATION 412.

Accordingly, a PII theft notification is provided in PROVIDE PII THEFT NOTIFICATION OPERATION 414. Illustratively, the user is provided the phone number of the credit card issuer along with the exposed credit card number, with a suggestion that the user contact the credit card issuer to cancel the credit card.

Optionally, the credit card issuer is directly contacted by personal identifiable information theft detection and remediation application 106 for cancellation of the credit card and reissuance of a new credit card in TAKE PROTECTIVE ACTION OPERATION 416.

In this manner, the malicious code detected on the host computer system 102 is remediated. Further, the user is notified that the user may be a victim of theft of the user's personal identifiable information. The notification contains sufficient information for the user to take proactive steps to reduce the consequences of the personal identifiable information theft such as to contact the user's credit card company to prevent or minimize any loss associated with the personal identifiable information theft.

Referring again to FIG. 1, personal identifiable information theft detection and remediation application 106 is in computer memory 114. As used herein, a computer memory refers to a volatile memory, a non-volatile memory, or a combination of the two.

Although personal identifiable information theft detection and remediation application 106 are referred to as an application, this is illustrative only. Personal identifiable information theft detection and remediation application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a tangible storage medium configured to store or transport computer readable code in accordance with an embodiment. Some examples of computer program products are CD-ROM discs (CDs), DVDs, ROM cards, floppy discs, magnetic tapes, computer hard drives, and servers on a network.

As illustrated in FIG. 1, this medium may belong to the computer system itself. However, the medium also may be removed from the computer system. For example, personal identifiable information theft detection and remediation application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the personal identifiable information theft detection and remediation functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the personal identifiable information theft detection and remediation functionality in accordance with one embodiment can be implemented in a wide variety of computer system configurations. In addition, the personal identifiable information theft detection and remediation functionality could be stored as different modules in memories of different devices. For example, personal identifiable information theft detection and remediation application 106 could initially be stored in server system 130, and then as necessary, a portion of personal identifiable information theft detection and remediation application 106 could be transferred to host computer system 102 and executed on host computer system 102. Consequently, part of the personal identifiable information theft detection and remediation functionality would be executed on processor 134 of server system 130, and another part would be executed on processor 108 of host computer system 102. In view of this disclosure, those of skill in the art can implement various embodiments in a wide-variety of physical hardware configurations using an operating system and computer programming language of interest to the user.

In yet another embodiment, personal identifiable information theft detection and remediation application 106 is stored in memory 136 of server system 130. Personal identifiable information theft detection and remediation application 106 is transferred over network 124 to memory 114 in host computer system 102. In this embodiment, network interface 138 and I/O interface 110 would include analog modems, digital modems, or a network interface card. If modems are used, network 124 includes a communications network, and personal identifiable information theft detection and remediation application 106 is downloaded via the communications network.

This application is related to Sarah Susan Gordon Ford et al., U.S. patent application Ser. No. 11/849,093, entitled "PHISHING NOTIFICATION SERVICE", filed on Aug. 31, 2007, which is herein incorporated by reference in its entirety.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
receiving configuration information from a user, the configuration information indicating specific personal identifiable information to be protected, the specific personal identifiable information being of the user;
determining that transmitted network content includes personal identifiable information included within the specific information previously received as configuration information from the user, the personal identifiable information within the transmitted network content being transmitted personal identifiable information, the transmitted personal identifiable information being formed of a critical portion and a noncritical portion, wherein the critical portion is a minimum amount of information necessary to identify the specific information previously received;
creating a transaction record that identifies the critical portion of the transmitted personal identifiable information and that identifies at least one of a time that the personal identifiable information was transmitted and an application responsible for transmitting the personal identifiable information;
storing the transaction record and discarding the noncritical portion of the transmitted personal identifiable information;
detecting malicious code, wherein the malicious code is present on a host computer system responsible for transmitting the personal identifiable information, wherein detecting malicious code comprises determining whether the malicious code is of a type that steals personal information;
determining, as a result of determining that the malicious code is of a type that steals personal information, that the critical portion of the transmitted personal identifiable information was exposed to the malicious code by querying the transaction record, wherein the determination is made by at least one of:
 determining if the time that the personal identifiable information was transmitted falls within a possible infection time period of when the host computer system may have been infected with the malicious code; and
 determining if the malicious code is the application identified by the transaction record as being responsible for transmitting the personal identifiable information; and
providing, as a result of determining that the malicious code is of a type that steals personal information, a personal identifiable information (PII) theft notification to the user, on the host computing system.

2. The computer-implemented method of claim 1 further comprising remediating the malicious code.

3. The computer-implemented method of claim 1 wherein determining that transmitted network content includes personal identifiable information comprises monitoring received network content for a personal identifiable information request.

4. The computer-implemented method of claim 3 wherein determining that transmitted network content includes personal identifiable information comprises determining that the transmitted network content is transmitted in response to the personal identifiable information request.

5. The computer-implemented method of claim 1 wherein determining that transmitted network content includes personal identifiable information comprises determining that a format of the transmitted network content matches a format of the personal identifiable information.

6. The computer-implemented method of claim 1 wherein determining that transmitted network content includes personal identifiable information comprises determining that the transmitted network content matches stored personal identifiable information input by a user.

7. The computer-implemented method of claim 1 wherein the personal identifiable information comprises one or more of a user's name, an account number, a password, a credit card number, a social security number, and a bank account number.

8. A computer-program product comprising a tangible, non-transitory computer readable storage medium containing computer program code comprising a personal identifiable information theft detection and remediation application comprising:
a personal identifiable information (PII) content analysis engine for receiving configuration information from a user, the configuration information indicating specific personal identifiable information to be protected, the specific personal identifiable information being of the user, the content analysis engine further for determining that transmitted network content includes personal identifiable information included within the specific information previously received as configuration information from the user, the personal identifiable information within the transmitted network content being transmitted personal identifiable information, the transmitted personal identifiable information being formed of a critical portion and a noncritical portion, wherein the critical portion is a minimum amount of information necessary to identify the specific information previously received;
a personal identifiable information (PIO logger for creating a transaction record that identifies the critical portion of the transmitted personal identifiable information and that identifies at least one of a time that the personal identifiable information was transmitted and an application responsible for transmitting the personal identifiable information;
a transaction record store for storing the transaction record and discarding the noncritical portion of the transmitted personal identifiable information;
a malicious code identification and remediation component for detecting malicious code, wherein the malicious code is present on a host computer system responsible for the transmission of the personal identifiable information, wherein detecting malicious code comprises determining whether the malicious code is of a type that steals personal information;
a personal identifiable information (PIO theft remediation engine and user interface for determining, as a result of determining that the malicious code is of a type that steals personal information, that the critical portion of the transmitted personal identifiable information was exposed to the malicious code by querying the transaction record store, wherein the determination is made by at least one of:
 determining if the time that the personal identifiable information was transmitted falls within a possible infection time period of when the host computer system may have been infected with the malicious code; and determining if the malicious code is the application identified by the transaction record as being responsible for transmitting the personal identifiable information; and wherein the PII theft remediation engine and user interface is further for providing, as a result of determining that the malicious code is of a type that steals personal information, a personal identifiable information (PIO theft notification to the user, on the host computing system.

9. The computer-program product of claim 8 wherein said personal identifiable information theft detection and remediation application further comprises:

a received network content monitoring component for monitoring received network content for a personal identifiable information request.

10. The computer-program product of claim 8 wherein the personal identifiable information theft detection and remediation application further comprises:

a personal identifiable information (PII) vault for storing a user's personal identifiable information.

* * * * *